United States Patent [19]
Butera

[11] 4,377,357
[45] Mar. 22, 1983

[54] DOWELING JIG

[76] Inventor: Anthony W. Butera, 112 Tuthill St., Port Jefferson, N.Y. 11777

[21] Appl. No.: 316,091

[22] Filed: Oct. 28, 1981

Related U.S. Application Data

[63] Continuation-in-part of Ser. No. 96,753, Nov. 23, 1979, abandoned.

[51] Int. Cl.³ .................. B23B 47/28; B23B 49/00; B23B 49/02
[52] U.S. Cl. .................. 408/115 R; 408/72 R
[58] Field of Search .......... 408/72 R, 72 B, 115 R, 408/115 B, 104, 108, 112, 103; 269/45, 88, 93, 101, 152, 249

[56] References Cited
U.S. PATENT DOCUMENTS

| 928,657 | 7/1909 | Howell | 269/93 |
| 2,260,784 | 10/1941 | Morton | 408/103 |
| 2,778,393 | 1/1957 | Golasowski | 269/249 |
| 2,836,087 | 5/1958 | Ehresmann | 408/115 |
| 3,082,651 | 3/1963 | Patrick | 408/72 |
| 3,934,316 | 1/1976 | Driscoll | 269/249 X |
| 4,093,394 | 6/1978 | Adams | 408/115 R |
| 4,145,160 | 3/1979 | Wiggins | 408/103 |
| 4,153,384 | 5/1979 | Isaken | 408/103 |

Primary Examiner—William R. Briggs
Assistant Examiner—Jerry Kearns

[57] ABSTRACT

This invention relates to a "T" shaped doweling jig and an attachable convertible clamp device for holding a work part. The doweling jig is comprised of a drill bit guide hole member and a base plate. The drill bit guide hole member is provided with at least one defined drill bit guide hole which is interchangeable with other guide hole members and provides a range of defined drill bit diameter guide holes. The base is provided with at least one alignment port hole, cut-outs and alignment indicies that correspond with said guide holes, and provides for the correct positioning and clamping of the doweling jig over the work part, and the subsequent passing of the drill bit through a guide hole in one direction to drill the first work part, and consecutively to pass the drill bit through the same guide hole in the opposite direction to drill a mirror image hole in a second work part. The convertible clamp is used in a "C" shaped configuration to drill holes in work parts to be joined in a side-to-side relation or is converted to a "Z" shape configuration to drill holes in work parts to be joined in a non planar right angle relation.

11 Claims, 25 Drawing Figures

SECTION A-A

C CLAMP

FIG 5a

Z CLAMP

BASIC BUILDING BLOCK

DOWELING JIG

This is a continuation-in-part of application Ser. No. 96,753, filed Nov. 23, 1979, now abandoned.

BACKGROUND OF THE INVENTION

Difficulty has always been encountered when two pieces of material are to be joined accurately together by dowels. The principle difficulty has been in the alignment of the two mating parts that are to be butt joined together and the subsequent drilling of holes in the two mating parts, such that after the holes are drilled and the dowels are inserted in the holes and the two mating parts are joined, the union and surfaces of each mating part will be true and flush with each other. Such accuracy is difficult to achieve with present state of the art dowel drilling jigs wherein said jig is used first on one mating piece and then turned around and used on the opposite mating piece to locate and drill the said opposite mating dowel holes. Herein is one of the main difficulties. That is, when the jig is turned around and used on the mating part any deviation from symmetry of the drill bit guide hole jig or any errors of alignment, or angles of drilling the holes of the first work part, are doubled when drilling a second dowel hole in the second mating work part.

Consequently, in the final assembly of the two parts, any misalignment of the dowel holes of the mating parts due to said assymetricies or operator error, can result in misalignment of the work parts as well as cause bending and stress in the dowels after final assembly of the mating parts. In the hands of a skilled craftsman, the current devices can be used successfully, but only with time-consuming effort and care. Another difficulty of existing dowel jigs is that they cover the work piece and therefore injects guesswork as to where the drill bit will penetrate the work piece.

SUMMARY OF THE INVENTION

This invention relates to a device to provide for the matching and flush assembly of two mating parts and for the subsequent drilling of a hole in each part such that a dowel inserted and common to both parts will insure that the two parts can be easily and accurately assembled. Simply put, it is the purpose and object of my invention to provide a simple jig (called an Accu-Template) with the use thereof, to obtain precise alignment for the drilling of holes in mating parts so that in the final assembly of the work parts the surfaces and joints of the said parts will be flush and in accurate alignment with each other as a replica of the initial assembly and that both the dowels and work parts are left without any residual internal bending strains and stresses due to misalignment. This invention greatly simplifies any previous method of dowel drilling operation and is an improvement by which a relatively unskilled operator can use visual indicias as aids to quickly achieve accurate results. An additional feature of this invention is that the Accu-Template is used to drill mirror image holes; and therefore does not have to be manufactured to an accurate symmetrical configuration and to close tolerances. Furthermore, the novelty of this invention combines a "T" shaped device and a simple sequence of operational steps so used that it automatically takes into account any manufacturing inaccuracies or deviations from symmetry of the device or any operator errors and passes these same inaccuracies on to the mating parts in a way that will negate any said inaccuracies of the jig and operator.

Another advantage of the Accu-Template combines a set of Alignment Indicia Aids with a feature similar to a see-through overlay or decal wherein an alignment port hole or a cut-out provides a visual alignment of a girth line on the Accu-Template with a scribe line on a work part while at the same time a keyed indicia of the Accu-Template A, is "arrowed" at a like indicia A on Part A and assures the user that the proper portion of the "Top" face has been chosen so as to insure the subsequent drilling of a mirror image hole in the second work part. The letters A and B have been selected as examples of any polyonymous indicia which can serve the same purpose. These features are most important in the production of cabinet frames with multiple combination of rails, and divider parts. These features also advantageously enable the user to "dry run" an assembly, mark the cross joints with a scribe line, label each work part, and then use the Accu-Template and its intrinsic Alignment Indicia Aids to drill mating dowel holes. Thus identical reassembly is assured and the possibility of reversing the Accu-Template or a mix up of parts is precluded. No where in any prior art can be found any intent to consider the combination of "keyed" indicias and see-through alignment aids with a mirror image principle to drill dowel holes in mating parts.

Another objective of the Accu-Template is to provide means with an attachable clamp, whereby the clamp configuration can be changed by a simple rotation of one of the parts of the said clamp to suit its use in drilling dowel holes in parts to be joined in a side-by-side or non-planar right-angle relation. A clamp already attached to the Accu-Template is an advantage and avoids juggling a loose C clamp and work part preparatory to drilling operations. Another advantage is that the drill bit guide hole member is removable and interchangeable with other drill bit guide hole members of various sizes containing various size drill bit guide holes. Therefore, because of the simplicity of construction, the Accu-Template can exist in kit form with a plurality of interchangeable parts that can cheaply and readily supply the needs of a myriad of dowel joined application. Another salient feature of the Accu-Template is that the "T" shape configuration allows any one of a variety of commercially available C clamps to be used instead of the EZ clamp to hold the work parts during drilling operations.

In addition, the Accu-Template has no moving parts, can be made out of commonly available stock material including plastics and steel insets to provide a built-in accuracy amenable to reproducability, being either the Accu-Template itself, or mass production of mating parts requiring the moving around of the Accu-Template as well as a plurality of parts required in drilling operations or assemblies.

DETAILED DESCRIPTION OF THE INVENTION

The following FIGS. 1–25a show variations of a basic "T" shaped Accu-Template and its uses in typical cabinetry construction consisting of a base plate attached to a drill bit guide hole member, whereby the said member is interchangeable with said base and is provided with means defining at least one drill bit guide hole corresponding to a range of drill bit diameters and a set of allied Alignment Indicia Aids. All the Accu-Template figures carry basically the same constituents, their order and arrangements differing only to complete an anticipated spectrum of uses.

Figure 3:
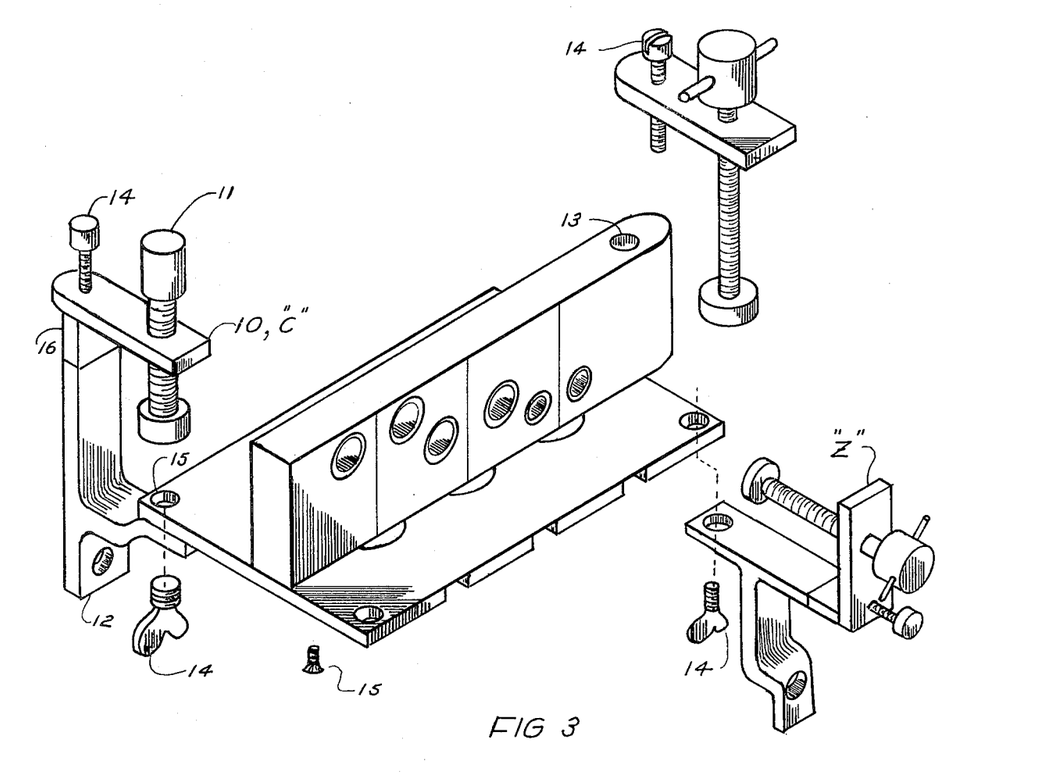
FIG. 3 is a perspective view of an Accu-Template with a plurality of stepped drill bit guide holes and an attachable EZ clamp in the "C" and "Z" configuration.
Figure 4:
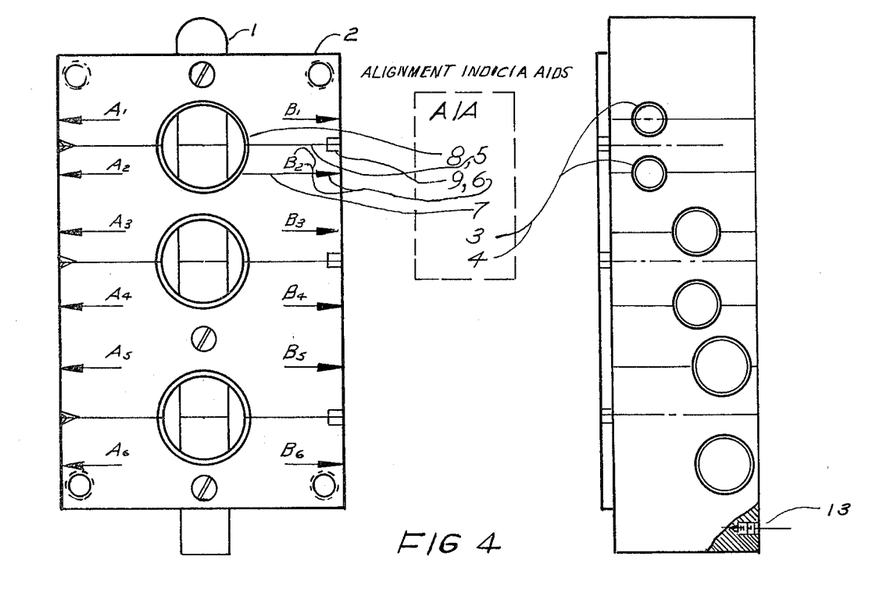
FIG. 4 is a top plan view of the Accu-Template as shown in FIG. 3 with a plurality of drill bit guide holes and the corresponding sets of AIA.

FIGS. 3,4, show an embodiment of the Accu-Template which includes the salient features common to the following figures shown in the specification including FIGS. 1,2,3,4,6,7,7a,8,8a,9,10,11,12,13,22–25b. A base plate 2 is attached by screw thread 13 to a drill bit guide hole member 1 with a base plate attachment screw 15. The drill bit guide hole 3 is shown with inserts 4, preferably of steel, carried transversely in the said member 1 and centrally located with a drill bit guide hole girth line 7 circumferentially scoring each surface of the Accu-Template and in juxtaposition with a set of AIA including (number, letters, arrows) 6, and cut-outs 9 located on the top surface of the Accu-Template also shown concurrently with the guide hole girth line 5 bisecting an alignment port hole 8 and circumferentially scoring each surface of the Accu-Template thereby defining a basic build block. The alignment port hole 8 has tapered sidewalls and is formed to a geometric shape by a countersink tool or the like, transversely piercing the top of the base plate and shapes the sides of the alignment hole in a ramp like relation to the top part, said cut-outs are geometrically shaped and formed as applicable with a triangular, or end mill machining tool or an applicably shaped file or the like to form a geometrically shaped ramp cut-out.

Figure 5A:
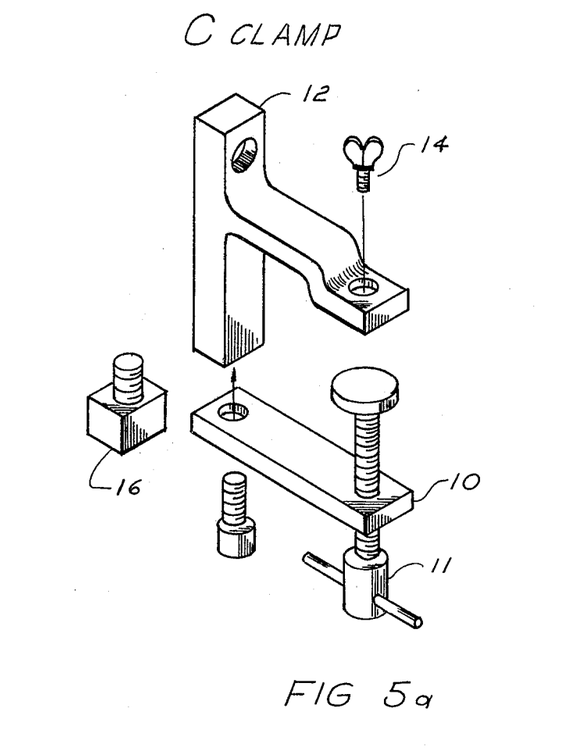
FIGS. 5a and 5b are perspective exploded views of the EZ clamp showing both the "C" clamp and "Z" clamp configuration respectively.
Figure 5B:
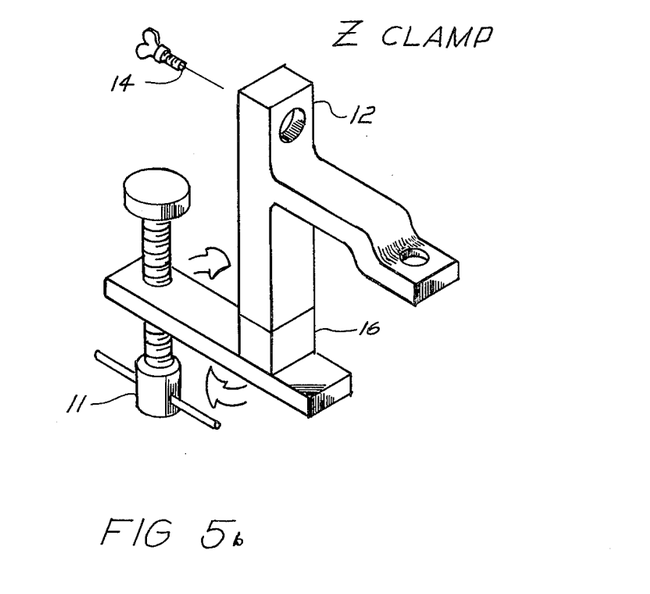
Figure 18A:
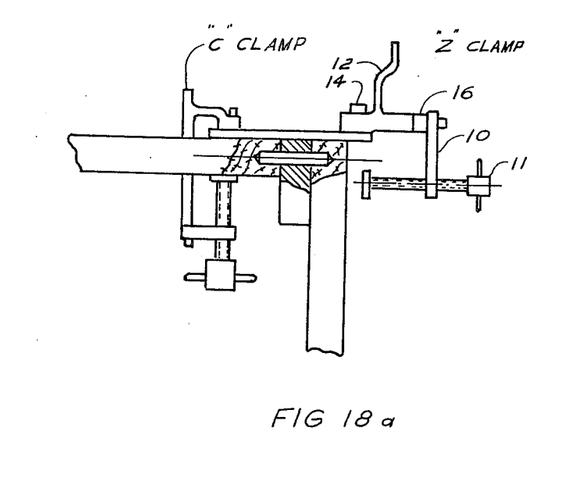
FIG. 18a is a cross section of the top and side boards of FIG. 14 and illustrates the use of the Accu-Template in drilling dowel holes in boards to be joined next to one another and at non-planar right angles to one another. Also illustrated is the convertible feature of the EZ clamp and its application in drilling dowel holes in boards to be joined in a side-to-side or right-angle relation to one another. Also shown is a schematic form showing the "Z" clamp configuration whereby the EZ clamp and "Z" clamp configuration in unison form a conventional C clamp.

FIG. 5 shows an EZ clamp in three different configurations for use in clamping the work part to the Accu-Template, whereby the said work parts are to be joined in a side-to-side or right-angle relation to one another. FIG. 5a shows a C clamp arrangement, whereby an EZ clamp base 10 carries an EZ clamp extension 16 and an EZ clamp frame 12 respectively with an EZ clamp attachment means 13, whereby the base 10 is positioned so that the clamp screw 11 is in line with the EZ clamp attachment means 15 carried in a perpendicular cantilever component projecting outwardly from said frame 12, therefore creating a C clamp configuration for use in joining boards in a side-to-side relation FIG. 18b. FIG. 5b shows the base 10 rotated 180° in relation to the frame 12 so that a "Z" shape is formed. In this configuration the EZ clamp is used to drill dowel holes in boards to be joined in a right-angle relation to one another as shown in FIG. 18a.

Figure 6:
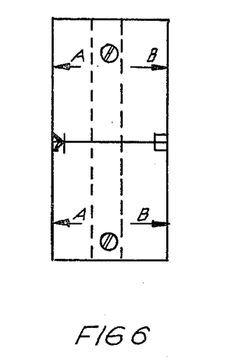
FIG. 6 is a top plan view of a single drill bit guide hole Accu-Template with the ends of the blade and base plate flush with each other and alignment opposed cut-outs.
Figure 7:
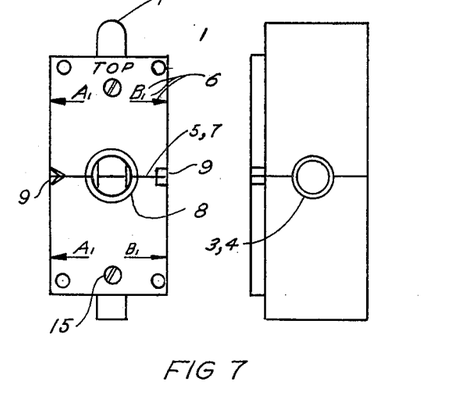
FIG. 7 is a top plan and side view of a single drill bit guide hole Accu-Template as in FIG. 6 with the guide hole member extended.
Figure 7A:
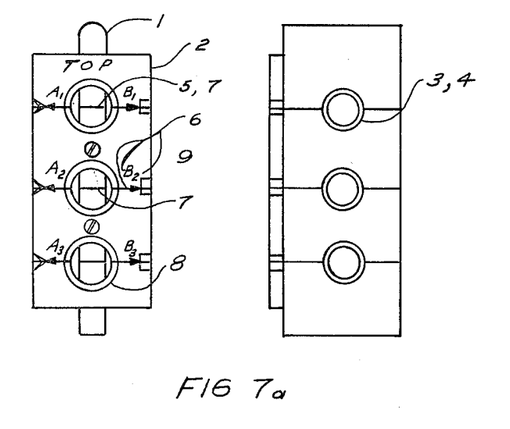
FIG. 7a is a side view of FIG. 7 and shows a plurality of guide holes located next to one another.
Figure 8:
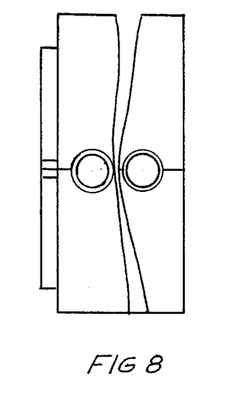
FIG. 8 is a side view of FIG. 7 and shows a plurality of drill bit guide holes one above the other.
Figure 8A:
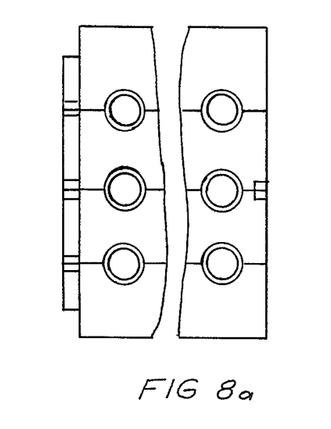
FIG. 8a shows a side view of the combination of FIG. 7a, and FIG. 8.
Figure 9:
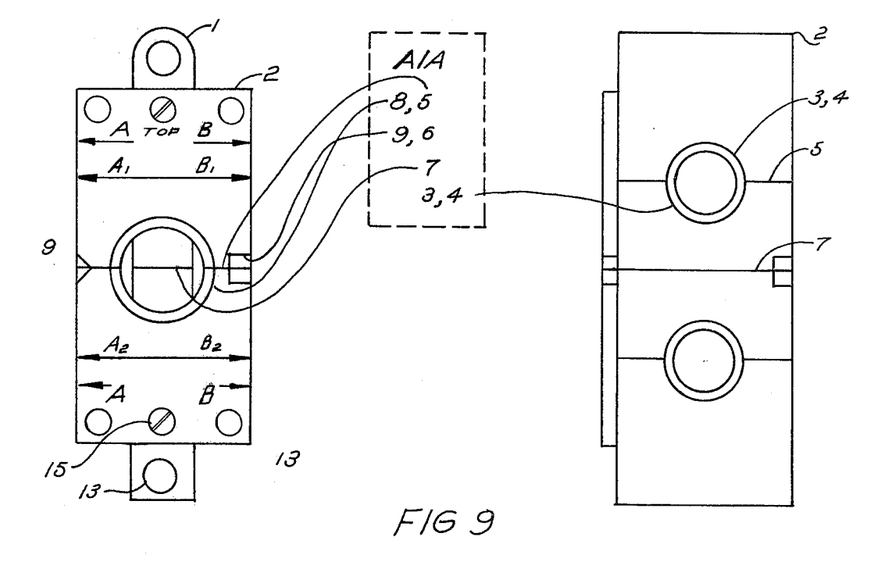
FIG. 9 is a top plan and side view of an Accu-Template with a group of two drill bit guide holes located next to one another and shows a typical application of a set of AIA in correspondence with drill bit guide holes commonly used in frames of cabinetry. Said FIG. 9 also shows a configuration of the Accu-Template with the salient features common to all Accu-Templates and constitutes a basic building block. A plurality of said building blocks are used in a single hole or group hole orientation so that a plurality of Accu-Templates with various size drill bit holes and various size drill bit guide member configurations can be constructed by a simple interchange of Accu-Template members and base plates. The basic building block comprises a set of Alignment Indicia Aids, AIA including means for defining drill bit guide hole, drill bit guide hole girth line, alignment port hole, alignment port hole girth line, opposite located assymmetric cut-outs, and assymmetric arrows, letters, and numbers.
Figure 10:
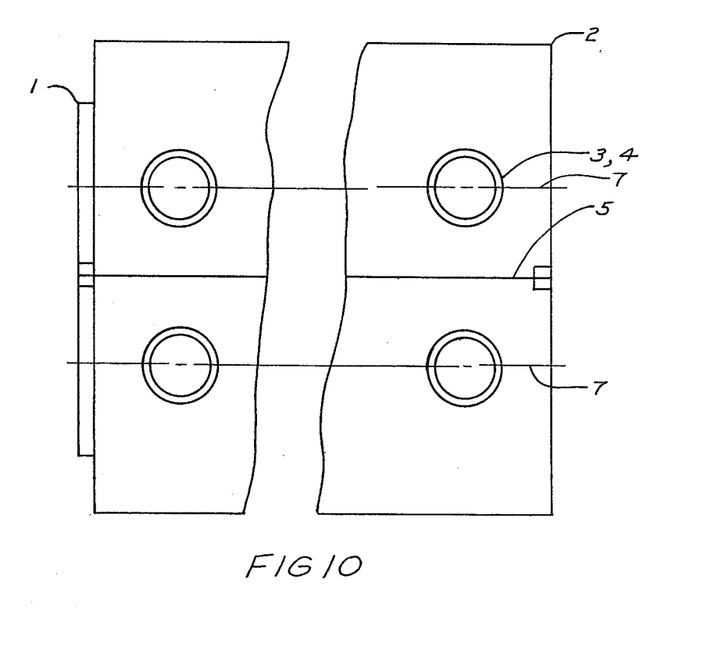
FIG. 10 is a side view of FIG. 9 and shows a plurality of sets of two drill bit guide holes located one above the other.
Figure 11:
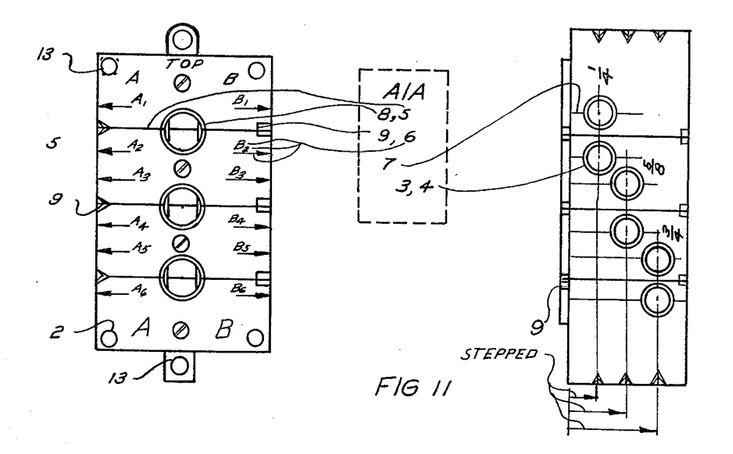
FIG. 11 is a top plan and side view of the Accu-Template showing a plurality of groups of various size drill bit guide holes stepped in relation to the base plate to match the center of a series of commercially available lumber thicknesses similar to FIG. 3 and FIG. 4.
Figure 12:
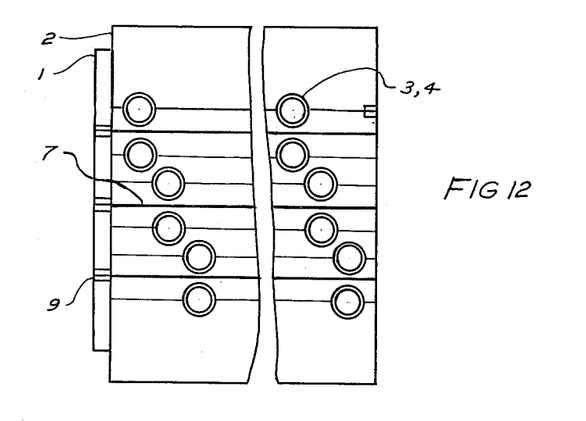
FIG. 12 is a side view of FIG. 11 and shows the Accu-Template with a plurality of stepped drill bit guide holes located one above the other.
Figure 13:
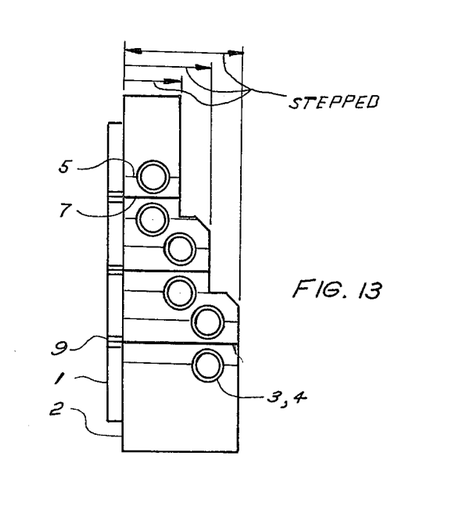
FIG. 13 is a side view of FIG. 11 and shows the lower end of the drill bit guide hole member stepped away from the base in relation to standard board thicknesses.

FIG. 6 shows the base 10 apart from the EZ clamp frame 12 and is used in this configuration to clamp boards to be drilled for dowel holes in a side-to-side relation.

Figure 14:
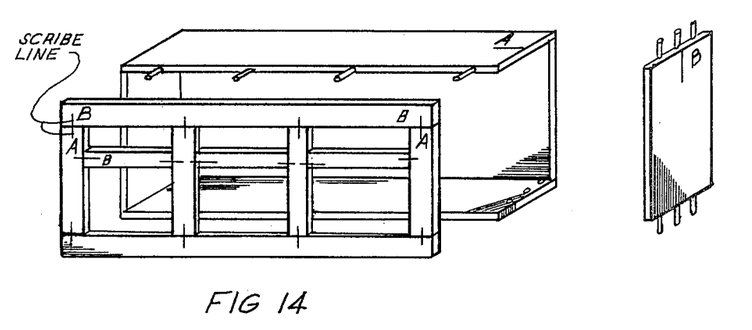
FIG. 14 is a perspective exploded view of a typical kitchen cabinet showing a sample construction of an arrangement of frame divider parts and boards, whereby the Accu-Template is used for drilling dowel holes in frame parts and boards to be joined in a side-to-side or non-planar right-angle relation.
Figure 15:
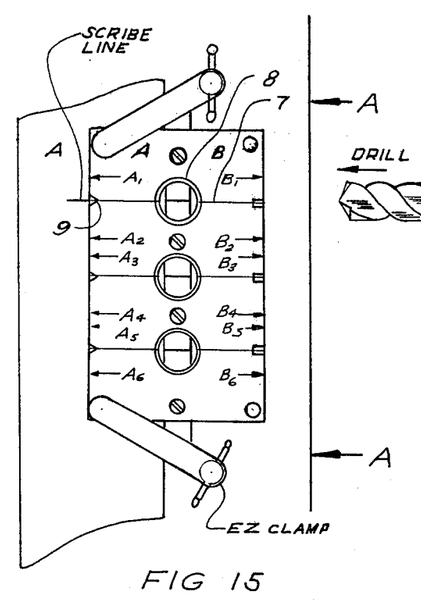
FIG. 15 is a schematic illustration of the use of the Accu-Template FIG. 11 as shown on FIG. 14, and clamped with an EZ clamp to a mating work part A, whereby the alignment hole 8 and triangular cut-out 9 provides a visual alignment of the inscribed drill bit guide hole girth line 7 on the Accu-Template with a scribe line on part A while at the same time the keyed Indicia "A" 6 of the Accu-Template is "arrowed" 6 at like Indicia "A" on part A.
Figure 18B:
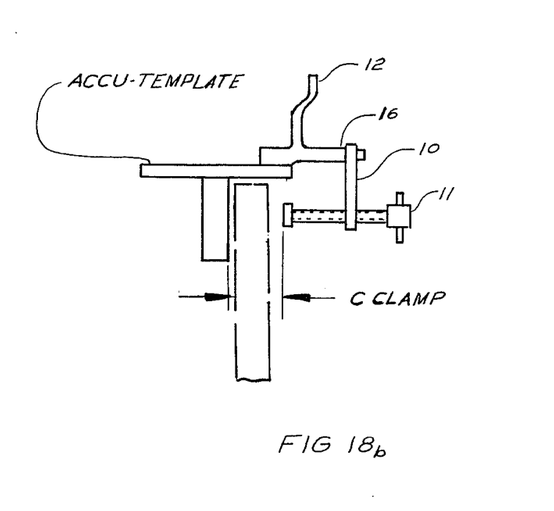
FIG. 18b shows an arrangement wherein the Accu-Template itself serves as one jaw portion of a C clamp.
Figure 19:
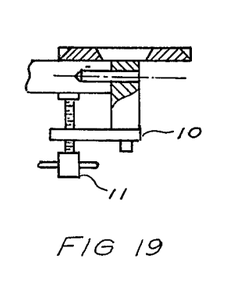
FIG. 19 shows use of the EZ clamp base as a substitute for the "C" clamp configuration in FIG. 18.
Figure 20:
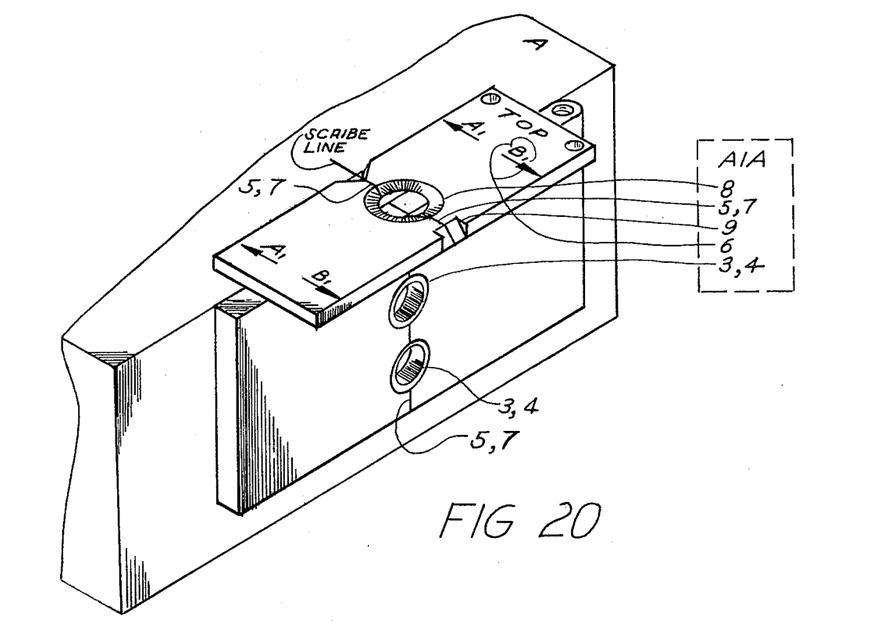
FIG. 20 is a perspective view of the Accu-Template, FIG. 8, in use to drill dowel holes one above the other in large beams.
Figure 21:
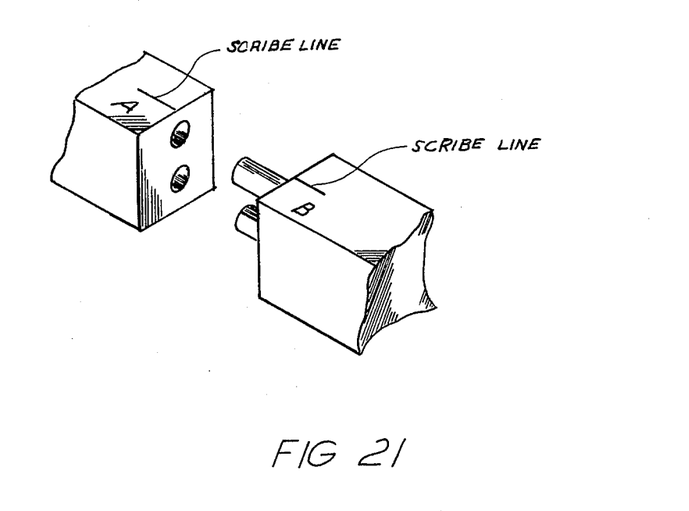
FIG. 21 is a perspective view of two large beams showing the location of dowel holes and dowels.

FIGS. 14, through FIGS. 22 show typical applications in which the Accu-Template may be used to provide mirror image dowel holes in two adjoining mating parts. With reference to FIG. 14 and FIG. 15 and the two intersecting frames in the upper left corner of a typical kitchen cabinet frame 14, the following sequence is prescribed. Step one, assemble and hold the parts of frame 14 in the desired location for final assembly ("dry run"), label each mating part A and B respectively, and imprint an alignment scribe mark 18 continuous from part A, across the joint and onto part B. Step two, with reference to FIG. 15, the Accu-Template (FIG. 9) is positioned and butt joined against the disassembled part A so that the arrow A, 6, on the top of the base plate 2 is in the direction of part A and is also on the surface marked A, whereby the alignment scribe mark 18 on part A now appears in the alignment port hole 8 and cut-out 9 and the Accu-Template can be adjusted so that the said alignment scribe mark 18 falls in line with an alignment port hole girth line 5 imprinted in the tapered or ramp surface of said port holes 8 or cut-outs 9 respectfully. The Accu-Template and work part A are now in proper orientation preparatory to drilling the first work part, and to insure said proper orientation, the Accu-Template is temporarily clamped to the work part with the C clamp configuration as shown in FIG. 18b or a common commercially available C clamp. The EZ clamp screw 11 is in position to clamp the work part A to the Accu-Template. With the Accu-Template clamped and aligned so that Indicia A 6 is arrowed and keyed to A on the work part, the drill bit is passed through the drill bit hole means 4, and through said guide holes 3,4 and into part A a distance of at least two diameters the size of the drill bit diameter. The operation of drilling the dowel holes in part A is now complete.

Figure 16:
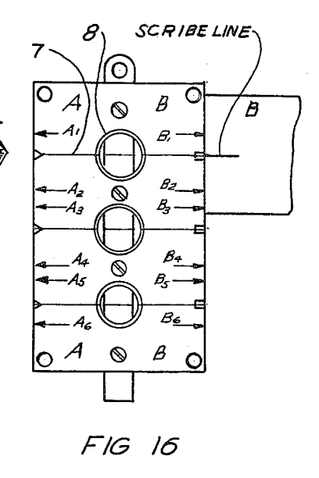
FIG. 16 is a schematic illustration of the application of the mirror image drilling of the dowel holes on the opposite mating work piece B, FIG. 14, whereby the keyed indicia B 6 of the Accu-Template is "arrowed" 6 at the like indicia B on part B while at the same time the inscribed girth line 7 in the alignment hole 8 as well as by the rectangular cut-out 9 is aligned with the scribe line on the mating part B.
Figure 17:
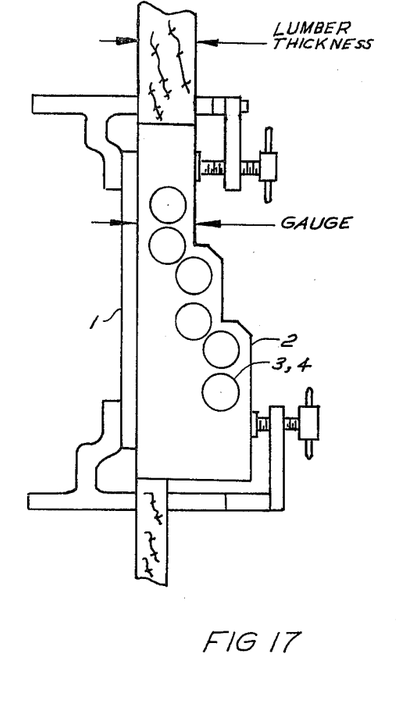
FIG. 17 is a side view of FIG. 15 illustrating the use of a stepped Accu-Template to gauge the thickness of a board and determine the corresponding drill bit guide holes.

The next sequence of operation is the procedure for the alignment and subsequent drilling of the dowel holes in the opposite mating part B, and herein lies the main essence in defining the novelty of this invention and illustrates the use of the mirror image principle. FIG. 16 shows the Accu-Template transferred from part A to part B by translation and placed to butt against part B and lie over and on part marked B so that the arrow, B, 6, on the top base plate 2 is in the direction of part B and is also on the surface marked B, whereby the said alignment scribe mark 18 on part B now appears in the alignment port hole 8 and cut-outs 9 and the Accu-Template is adjusted so that the said alignment scribe mark 18 falls in line with an alignment port hole girth line 5 imprinted in the tapered or ramp surface of said port holes or cut-outs 9 respectively. The Accu-Template and work part are now in proper orientation preparatory to drilling the second work part, and to insure orientation against movement, the Accu-Template is temporarily clamped to the work part with the C clamp configuration as shown in FIG. 18b or a common commercially available C clamp. With the Accu-Template aligned so that Indicia B 6, is "arrowed" 6 and keyed to B on the work part, the drill bit is passed in an opposite direction through the same drill bit guide hole means 3,4 and into part B a prescribed distance. The operation of drilling the second dowel hole in mirror image relation to the first drilled dowel hole is now complete. The two parts are now ready to receive the dowels and be reassembled. This completes the sequence of operations and use of the Accu-Template in drilling dowel holes in work parts to be joined in a side-to-side relation to one another.

Figure 15A:
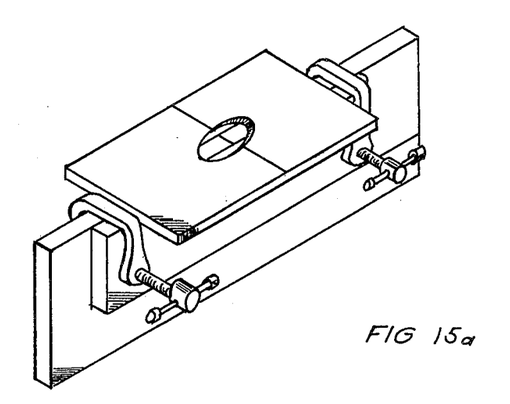
FIG. 15a shows an alternate means of clamping the Accu-Template to the workpiece utilizing the extended portion of the Accu-Template and a conventional C clamp; also, other commercially available clamps can be used including clamps that are of the quick release type.

For work parts to be joined in a non-planar right-angle relation to one another as shown with two boards in the upper right-hand corner of the kitchen cabinet structure FIG. 14, the sequence for drilling dowel holes is identical with the aforementioned procedure with the following exception. The EZ clamp is arranged in a "Z" configuration FIG. 5b and is attached to the Accu-Template as shown in FIG. 18 with means of an EZ attachment screw 14 and EZ clamp attachment screw threads on a selected corner of the Accu-Template 13. In this application, the EZ clamp FIG. 18a clamps the work part to the Accu-Template by using the drill bit guide hole member for the opposite side of the C clamp. This feature is particularly adaptable for use with thick boards, wereby the opening range of the EZ clamp can be extended with an EZ clamp extension 16 attached to the bottom of the EZ clamp frame 12. Otherwise, whereby thin boards are to be joined, a common C clamp can be used in a conventional manner and clamp the Accu-Template and work piece as shown in FIG. 18a. FIG. 15a shows another variation of the Accu-Template, whereby the extended portion of the drill bit guide hole member 1 is utilized to clamp the work part to the Accu-Template for drilling holes in boards to be joined in a right-angle relation to one another. Again the EZ clamp can be attached to the Accu-Template as previously described and used in the same manner.

Another advantage of the extended end portion of the said guide member is that one end is dissimilar to the other end and thereby aids the user in selecting the proper orientation of the Accu-Template in relation to the work part.

Figure 22:
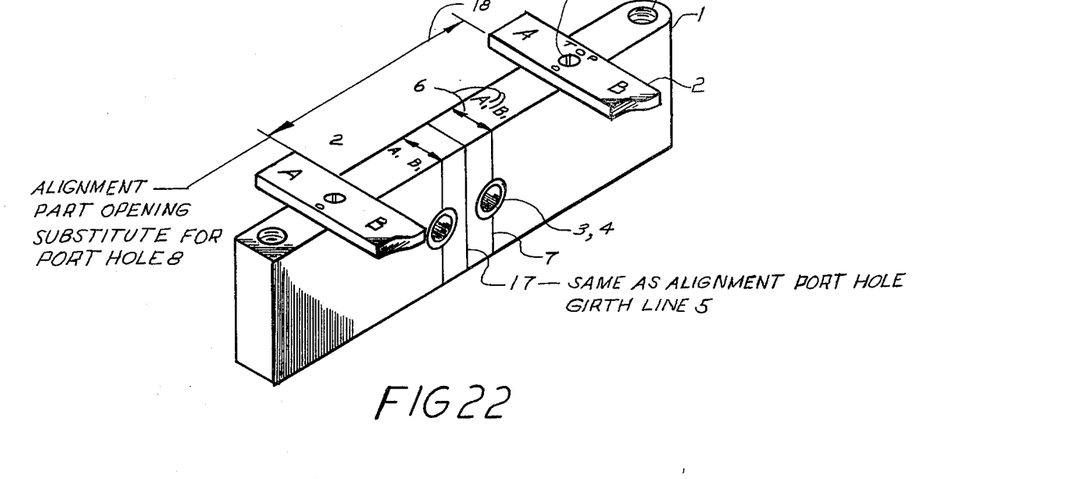
FIG. 22 is a perspective view of an Accu-Template with a plurality of drill bit guide holes in correspondence with a set of Alignment Indicias Aids and an alignment girth line, a drill bit guide hole, girth line and two base plates.
Figure 23:
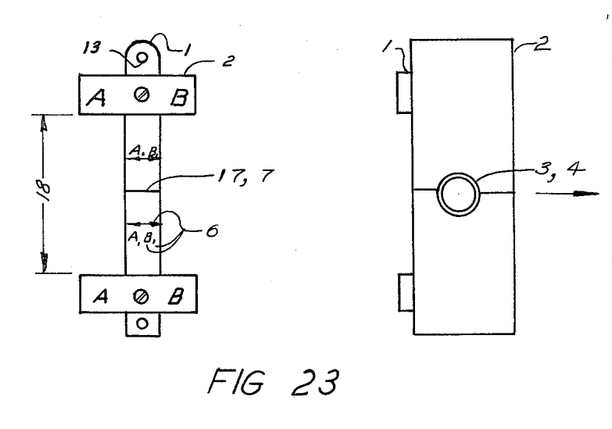
FIG. 23 is a top plan view and a side view of an Accu-Template in accordance with FIG. 22 and shows a single drill bit guide hole.
Figure 23A:
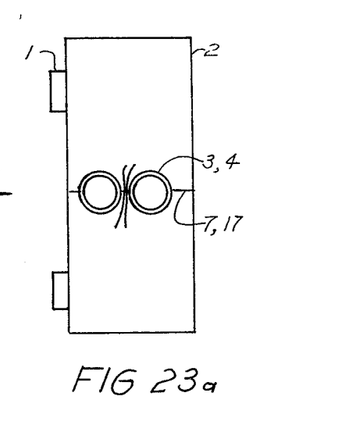
FIG. 23a is a side view of the Accu-Template as in FIG. 23 and shows a plurality of drill bit guide holes one below the other.
Figure 24:
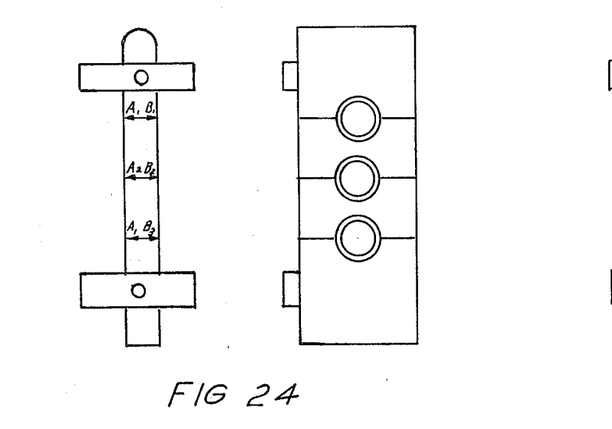
FIG. 24 is a top plan view and side view of an Accu-Template and shows a plurality of drill bit guide holes next to one another.
Figure 24A:
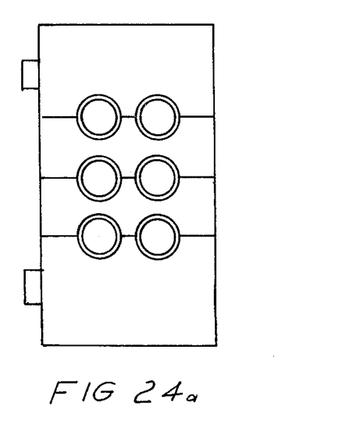
FIG. 24a is a side view of the Accu-Template, FIG. 24, and shows a plurality of drill bit guide holes located one below the other.
Figure 25:
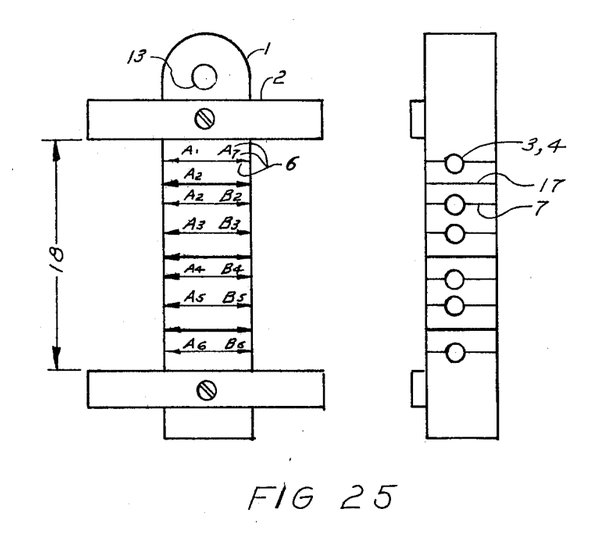
FIG. 25, 25a, is a top plan and side view of an Accu-Template and shows a plurality of groups of various size drill bit guide holes in line or stepped in relation to the base plate to match the center of a series of commercially available lumber thicknesses.
Figure 25A:
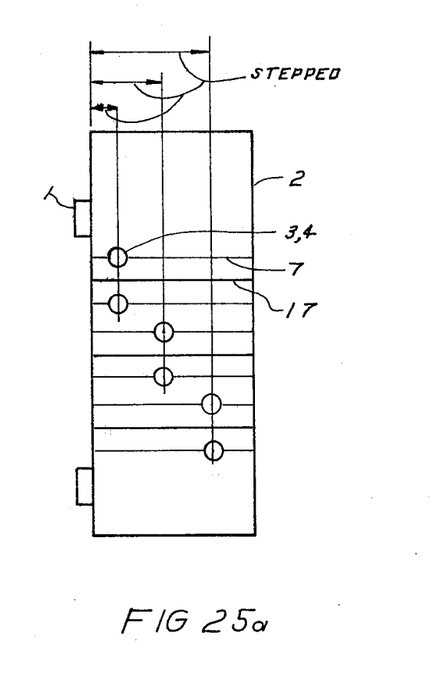
Figure 25B:
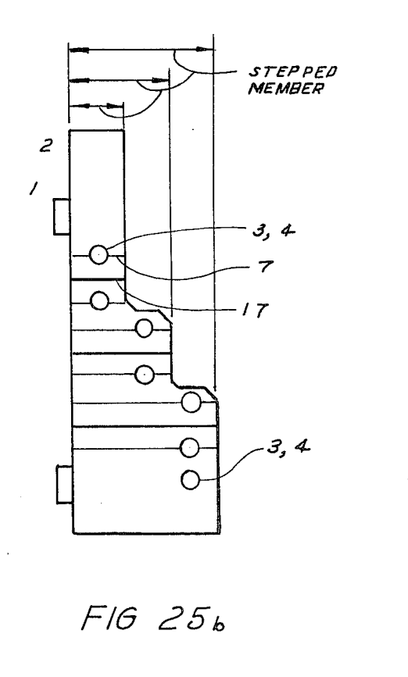
FIG. 25b is a side view of FIG. 25 and shows the guide hole member stepped away from the bottom surface of the base plate in relation to groups of plurality of guide holes to match a series of lumber thicknesses.

FIG. 22 through FIG. 25a shows an Accu-Template of slightly different configuration, and yet maintains all the salient features of previously discussed Accu-Templates. As shown, a variety of drill bit guide hole members 1 carries a plurality of drill bit guide holes, 3, with Alignment Indicia Aids 6, drill bit guide hole girth lines 5 and an attachable base 12 composed of two substantially rectangular base plates 2, all constituents of the Accu-Template are congruous with previously described similar matter. The main difference between the aforementioned Accu-Templates and FIG. 22 is noticed in the absence of an alignment port hole. In this presentation, the space between the said base plates 18 provides an overall alignment opening, similar to the aforementioned alignment port hole, 8, wherein is imprinted an alignment part girth line 5, drill bit guide hole girth line 7, which serves in the same capacity as previously discussed procedures. The advantage of this configuration is best utilized wherein maximum useage of conventional C clamps is desired. Also, this Accu-Template can be manufactured cheaply, out of plastics and with steel inserts, in a myriad of combinations of guide hole members and drill bit guide hole diameters to accommodate the needs of a handyman or a skilled craftsman.

Figure 1:
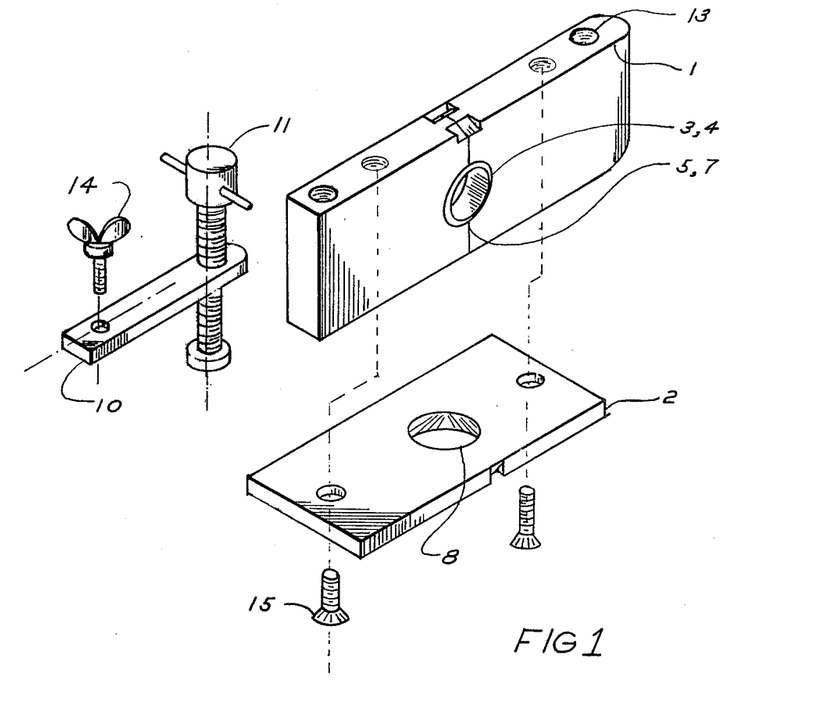
FIG. 1 is a perspective exploded view of a single drill bit guide hole Accu-Template including the base portion of an attachable EZ clamp base.
Figure 2:
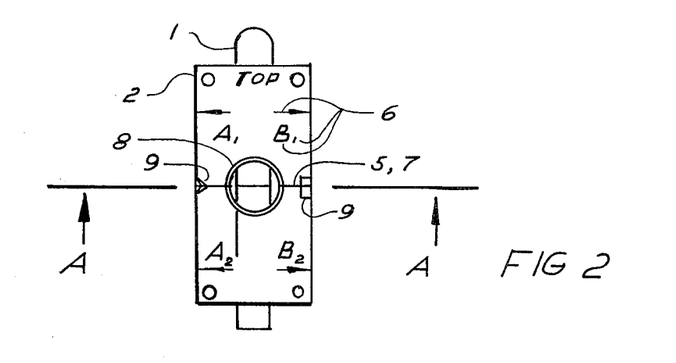
FIG. 2 is a top plan view of a single drill bit pilot hole Accu-Template as shown in FIG. 1 and shows a set of Alignment Indicia Aids including letters, numbers, arrows, a port hole girth line, a guide hole girth line, cut-outs and a port hole.
Figure 2A:
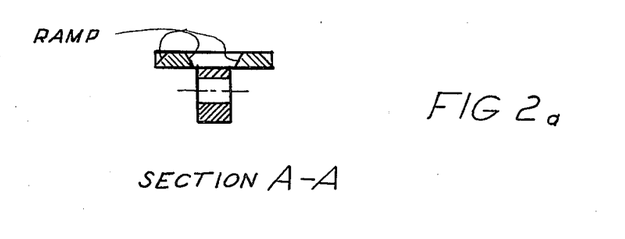

Although the aforementioned detailed description in conjunction with FIGS. 1→25b shows a number of embodiments of the invention using an assembly of at least to pieces two parts and an attachable EZ clamp it is to be understood that other assemblies utilizing more than said constituents may be made, as well as other embodiments may be made and incorporated as the results of considerations due to economics of production or marketing, which come within the scope and essence of the invention.

I claim:

1. A "T" shaped doweling jig comprising a substantially rectangular base plate having a top face with two parallel side edges, at least one alignment port hole formed through said top face, said alignment port hole having sides which taper in ramp-like configuration from a predetermined larger opening to a predetermined smaller opening, at least one ramp-like tapered cut-out formed in each of said side edges, at least one straight port hole girth line extending across said top face from one of said cut-outs to another of said cut-outs, said girth line bisecting said alignment port hole, a substantially rectangular drill bit guide hole member having a top surface with two parallel side edges with a thickness less than said predetermined smaller opening, at least one defined drill bit guide hole extending transversely through said guide hole member, at least one straight guide girth line extending transversely across said top surface from edge to edge, said guide hole girth line bisecting said guide hole, means for attaching said guide hole member to said base plate, said guide hole member being centrally and perpendicularly attached to said base plate to form said "T" shaped doweling jig and intersect said alignment port hole, convertible clamp means for clamping said doweling jig to a workpiece, means for removably attaching said clamp means to said doweling jig, said clamping means comprising a substantially rectangular clamp base portion having two ends, a threaded bore formed through one of said ends, a clamp screw threadably engaged in said threaded bore, a substantially rectangular frame portion, a substantially rectangular frame extension portion attached perpendiculary to said frame portion, a substantially rectangular axial frame extension portion, means for removable attaching said frame extension portion axially to the other end of said frame portion, means for rotatably attaching said frame portion to the other end of said clamp base portion whereby said clamp means can be selectively converted from a "C" configuration to a "Z" clamp configuration by rotating said frame portion relative to said clamp base portion.

2. A doweling jig in accordance with claim 1, wherein said guide hole member is removably attached to said base plate and is selected from a plurality of guide hole members, each having a different configuration of drill bit guide holes with associated girth lines in a predetermined relationship.

3. A doweling jig in accordance with claim 1, wherein said guide hole member is integral with said base plate and is of one piece construction.

4. A doweling jig in accordance with claim 1, wherein said base plate has a plurality of alignment port holes with associated girth lines and cut-outs.

5. A doweling jig in accordance with claim 1, wherein other alignment markings and indicia including lines, arrows, numbers, and letters are imprinted on said top face.

6. A doweling jig in accordance with claim 5, wherein said alignment markings and indicia are imprinted on said top face in decal form.

7. A doweling jig in accordance with claim 1 wherein said drill hole guide member has a plurality of guide holes which are displaced parallel from said base plate in a predetermined pattern and are stepped away from said base in general relation to match the center of a series of standard lumber thicknesses.

8. A doweling jig in accordance with claim 7 wherein said drill hole guide member is stepped in width parallel from said base plate in relation with said stepped guide holes.

9. A doweling jig in accordance with claim 1 wherein said guide hole member has a portion protruding beyond both ends of said top face of the base plate to facilitate clamping of the doweling jig to the work piece.

10. A doweling jig in accordance with claim 9 wherein one end of said protruding portion has a semicircular-like index portion, being different from the other end, to facilitate proper disposition of the doweling jig relative to the work piece during use.

11. A doweling jig in accordance with claim 1 wherein said defined drill guide holes are guide bushing inserts.

* * * * *